United States Patent [19]

Olson

[11] 3,871,123
[45] Mar. 18, 1975

[54] SHOCK-ABSORBING FLY LEADER

[75] Inventor: Craig W. Olson, River Falls, Wis.

[73] Assignee: Minnesota Mining and Manufacturing Company, St. Paul, Minn.

[22] Filed: May 1, 1974

[21] Appl. No.: 465,735

[52] U.S. Cl. .............................. 43/42.72, 43/44.98
[51] Int. Cl. ............................................ A01k 91/00
[58] Field of Search ........................ 43/44.98, 42.72

[56] References Cited
UNITED STATES PATENTS
2,184,187 12/1939 Hildebrandt ...................... 43/44.98
2,218,946 10/1940 Barnett .............................. 43/42.72
3,453,769 7/1969 Chandler ............................ 43/44.98
3,525,173 8/1970 Pickering ........................... 43/44.98

*Primary Examiner*—Warner H. Camp
*Attorney, Agent, or Firm*—Alexander, Sell, Steldt & DeLaHunt

[57] ABSTRACT

A fly leader in which an elastic shock-absorbing section between the butt and tippet sections provides the leader with the ability to absorb large sudden stresses as caused by a hard fish strike or sudden entanglement with an obstruction while playing a hooked fish.

4 Claims, 1 Drawing Figure

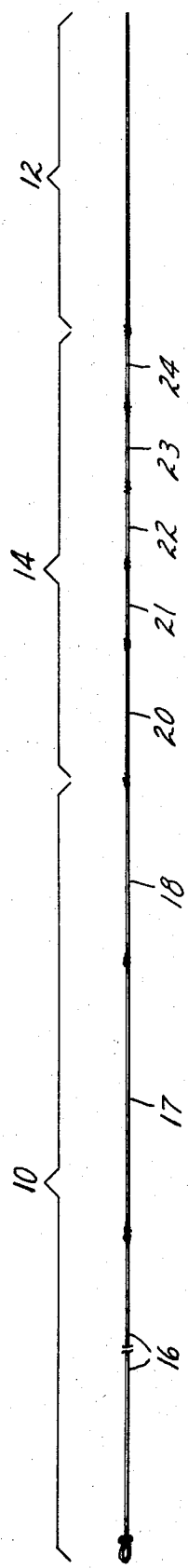

SHOCK-ABSORBING FLY LEADER

FIELD OF THE INVENTION

The present invention relates to a fly leader for use at the end of a fishing line for fly fishing.

BACKGROUND OF THE INVENTION

Sport fishing with artificial flies or bugs is very popular. To make an effective presentation of the fly to the fish, it must be attached to the relatively heavy opaque fly line by means of a leader. The leader is tapered from the butt section connected to a fishing line to the tippet section at the end of which the fly is tied and the stiffness to diameter ratio is generally constant along the length of the leader to carry the momentum of the cast through the leader to roll the leader out on the surface of the water and delicately present the fly.

Generally, fly leaders are from 7½ to 12 feet in length and are constructed by tying together lengths of monofilament nylon line of decreasing diameters tapering from the butt section to the tippet section. Utilizing specially constructed lines that are themselves tapered, the butt and tippet sections may consist of single lengths of nylon as disclosed in U.S. Pat. No. 3,453,769. However, more often, multiple uniform diameter lengths of nylon monofilament are tied together to form the leader.

The critical properties required of fly fishing leaders generally precludes the application thereto of principles utilized with respect to spinning, spin casting or bait casting leaders. Thus, while shock-absorbing sections have been utilized in conjunction with fishing lines, as exemplified by U.S. Pat. Nos. 1,296,057; 2,085,320; 2,218,946; 2,267,285; and 3,318,037, it has not heretofore been found applicable to fly fishing.

SUMMARY OF THE INVENTION

The present invention provides a fly leader for use at the end of a fishing line for fly fishing including a butt section, a tippet section, and an elastic shock absorbing section between the butt and tippet sections, the leader being tapered from the free end of the butt section to the free end of the tippet section. The elastic section has the same stiffness to diameter ratio as the butt and tippet sections, an elastic limit less than the knotted break strength of the tippet section and a length and modulus of elasticity to provide a predetermined elongation within its elastic limit.

THE DRAWING

The drawing is a longitudinal view of a fly leader constructed in accordance with the present invention.

The leader comprises a butt section 10, a tippet section 12 and a taper section 14 between the butt and tippet sections. In the illustrated embodiment the butt section consists of three lengths 16, 17 and 18 of nylon monofilament of decreasing diameter. The taper section consists of five lengths 20, 21, 22, 23, 24 which are of decreasing diameter and which, except for the center section 22 are also nylon monofilament. The tippet section consists of a single length of nylon monofilament of a lesser diameter than the smallest diameter section 24 of the taper section 14.

The center section 22 of the taper section 14 comprises a shock-absorbing section. The shock-absorbing section is of an elastic material having the same stiffness to diameter ratio as the butt and tippet sections 10 and 12 and the remainder of the taper section 14. This is necessary for the leader to "turn over" and properly present the fly in use. The shock-absorbing section 22 has an elastic limit less than the knotted break strength of the tippet section 12 and a length and modulus of elasticity to provide a predetermined elongation within its elastic limit to provide a predetermined shock-absorbing capability within the tensile strength of the remainder of the leader. Increasing the length of the shock-absorbing section 22 will of course increase the shock-absorbing capability of the leader but it is also desirable to maintain it as short as possible since an increase in length also increases the difficulty in setting the hook. A very good material for the shock-absorbing section 22 has been found to be a polyester of 1–4 butanediol and terephthalic acid available from the Goodrich Company with offices at Akron, Ohio under the designation Goodrich 1661Polyester. That material has a modulus of elasticity of about 410,000 pounds per square inch, an elongation within its elastic limit of about 22 percent and a tensile strength of about 54,000 pounds per square inch. Using Goodrich 1661 Polyester it has been found that the shock absorbing section 22 should be at least about 6 inches long but no more than about 10 inches long and preferably about 7 inches.

A 12 foot—6X tapered trout leader was constructed in accordance with the present invention utilizing length and diameter specifications published by the Orvis Company with offices at Manchester, Vermont as follows:

| Section | Length (inches) | Diameter (inches) |
|---|---|---|
| 16 | 36 | .021 |
| 17 | 24 | .019 |
| 18 | 16 | .017 |
| 20 | 12 | .015 |
| 21 | 7 | .013 |
| 22 | 7 | .011 |
| 23 | 7 | .009 |
| 24 | 7 | .007 |
| 12 | 28 | .005 |

Luxor nylon leader material obtained from the Orvis Company was utilized for each section of the leader except the shock-absorbing section 22 for which Goodrich 1661 Polyester was used. This leader exhibited the desired casting characteristics, the shock-absorbing section 22 being compatible for knotting with the nylon and exhibiting a 20 percent elongation for a force well below the tippet knotted break strength and an immediate recovery when the force is withdrawn.

I claim:

1. A fly leader for use at the end of a fishing line for fly fishing, said leader comprising:
    a butt section,
    a tippet section, and
    an elastic shock-absorbing section between said butt and tippet sections, said elastic section having the same stiffness to diameter ratio as said butt and tippet sections, an elastic limit less than the knotted break strength of said tippet section and a length and modulus of elasticity to provide a predetermined elongation within its elastic limit,
    said leader being tapered from the free end of said butt section to the free end of said tippet section.

2. The fly leader of claim 1 wherein said butt and tippet sections are of nylon and said elastic section is a polyester of 1-4 butanediol and terephthalic acid.

3. The fly leader of claim 2 wherein said elastic section forms a portion of a taper section between said butt and tippet sections.

4. The fly leader of claim 2 wherein said elastic section is between about 6 inches and 10 inches in length.

* * * * *